United States Patent
Hoesl

(10) Patent No.: US 9,253,179 B2
(45) Date of Patent: Feb. 2, 2016

(54) MANAGING SECURITY RESTRICTIONS ON A RESOURCE IN A DEFINED ENVIRONMENT

(71) Applicant: International Business Machines Corporation, Armonk, NY (US)

(72) Inventor: Mark J. Hoesl, Friendswood, TX (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 14/091,730

(22) Filed: Nov. 27, 2013

(65) Prior Publication Data

US 2014/0096204 A1 Apr. 3, 2014

Related U.S. Application Data

(63) Continuation-in-part of application No. 13/548,789, filed on Jul. 13, 2012, now Pat. No. 8,756,655.

(51) Int. Cl.
*H04L 9/32* (2006.01)
*H04L 29/06* (2006.01)
*G06F 21/62* (2013.01)

(52) U.S. Cl.
CPC .............. *H04L 63/08* (2013.01); *G06F 21/62* (2013.01)

(58) Field of Classification Search
CPC ..... H04L 63/08; H04L 63/0861; H04L 63/10; H04L 63/20; H04L 63/101; H04L 63/107; G06F 21/31; G06F 21/50
USPC .......... 726/1–10; 713/168–170; 709/223–225
See application file for complete search history.

(56) References Cited

U.S. PATENT DOCUMENTS

| 7,316,030 B2 | 1/2008 | Audebert et al. |
| 7,380,279 B2 | 5/2008 | Prokupets et al. |
| 7,437,755 B2 | 10/2008 | Farino et al. |
| 8,091,121 B2 | 1/2012 | Lioy |

(Continued)

FOREIGN PATENT DOCUMENTS

JP  2008046724 A  2/2008

OTHER PUBLICATIONS

Hosuk Song, USPTO Office Action, U.S. Appl. No. 13/548,789, Notification Dated Aug. 23, 2013, 11 pages.

(Continued)

*Primary Examiner* — Hosuk Song
(74) *Attorney, Agent, or Firm* — Daniel R. Simek; Madeline F. Schiesser; Keohane & D'Alessandro PLLC

(57) ABSTRACT

Approaches described herein manage security restrictions on a resource in a defined environment to provide authorization and access. Specifically, a security system maintains a security restriction on the resource (e.g., an information technology (IT) account of a user, or an apparatus) in a defined environment. The presence of a plurality of users is continuously monitored throughout the defined environment and, based on a detection of a pre-specified set of users from the plurality of users in the defined environment, the security restriction is managed (e.g., removed or maintained). In one embodiment, the system removes the security restriction from the resource to allow at least one of: access to the IT account of the user, and operation of the apparatus. The security restriction on the resource may then be reinstated in the case that the pre-specified set of users from the plurality of users is no longer present in the defined environment.

12 Claims, 4 Drawing Sheets

(56) References Cited

U.S. PATENT DOCUMENTS

| | | | |
|---|---|---|---|
| 8,166,530 B2* | 4/2012 | Adams et al. | 726/9 |
| 8,171,528 B1* | 5/2012 | Brown | 726/3 |
| 8,644,506 B2* | 2/2014 | Zellner | 380/249 |
| 8,689,287 B2* | 4/2014 | Bohmer et al. | 726/2 |
| 8,756,655 B2* | 6/2014 | Hoesl | 726/2 |
| 2008/0271109 A1 | 10/2008 | Singh et al. | |
| 2010/0017874 A1 | 1/2010 | Piccinini et al. | |
| 2014/0020056 A1 | 1/2014 | Hoesl et al. | |

OTHER PUBLICATIONS

Amazon Cloud Front Developer Guide, API Version May 5, 2012. Copyright 2012 Amazon Web Services, LLC, 229 pages. No author cited.

Song, U.S. Appl. No. 13/548,789, Notice of Allowance dated Feb. 4, 2014, 21 pages.

* cited by examiner

MANAGING SECURITY RESTRICTIONS ON A RESOURCE IN A DEFINED ENVIRONMENT

CROSS-REFERENCE TO RELATED APPLICATION

This patent document is a continuation-in-part of, and claims the benefit of, co-owned U.S. patent application Ser. No. 13/548,789, filed Jul. 13, 2012 (now U.S. Pat. No. 8,756,655 issued Jun. 17, 2014), the entire contents of which are herein incorporated by reference.

TECHNICAL FIELD

This invention relates generally to security in an information technology (IT) environment and, more specifically, to managing security restrictions on a resource in a defined environment.

BACKGROUND

Security of information, assets, and people is a desired objective. To reduce security risks, it is desirable to only expose authorization/access authority when a user needs it. For example, an employee may work an 8-hour day, yet his/her system access is available around the clock leaving the system unnecessarily vulnerable for 16 hours. In addition, the system shouldn't be left available when an employee is sick, on vacation, on leave, is working from home, at a customer site, at lunch, off on a holiday, running errands, etc. The ratio of need versus idle time drastically skews periods of vulnerability unnecessarily. Unfortunately, these off-peak hours may be considered an opportune time to compromise a system because fewer staff members/employees are present to notice and/or respond to breaches.

Sensitive information can be secured in part by managing access to such information, including access to electronic information, networks, devices associated with networks, and information systems associated therewith. Managing access can include, for example, requiring authentication or access credentials before allowing access to such information, networks, devices, and information systems. Further, many entities maintain security of their physical premises to secure physical assets, information, and people. Security of physical premises can include, for example, requiring access credentials for access and monitoring the access of individuals to the physical premises. However, challenges can arise with regard to maintaining the security of information (e.g., electronic information), networks, associated devices, and information systems, while still facilitating access at the appropriate time to such information to those persons or entities that require it.

SUMMARY

In general, embodiments of the invention provide an approach for managing security restrictions on a resource in a defined environment to provide authorization and access. Specifically, a security system maintains a security restriction on the resource (e.g., an information technology (IT) account of a user, or an apparatus) in a defined environment. The presence of a plurality of users is continuously monitored throughout the defined environment and, based on a detection of a pre-specified set of users from the plurality of users in the defined environment, the security restriction is managed (e.g., removed or maintained). In one embodiment, the system removes the security restriction from the resource to allow at least one of: access to the IT account of the user, and operation of the apparatus. The security restriction on the resource may then be reinstated in the case that the pre-specified set of users from the plurality of users is no longer present in the defined environment.

One aspect of the present invention includes a method for managing security restrictions on a resource in a defined environment, the method comprising the computer-implemented steps of: maintaining a security restriction on a resource in a defined environment, the resource comprising at least one of: an information technology (IT) account of a user, and an apparatus; continuously monitoring a presence of a plurality of users in the defined environment; and managing the security restriction on the resource based on a detection of a pre-specified set of users from the plurality of users in the defined environment.

Another aspect of the present invention provides a system for managing security restrictions on a resource in a defined environment, the system comprising: a memory medium comprising instructions; a bus coupled to the memory medium; and a processor coupled to a security system via the bus that when executing the instructions causes the system to: maintain a security restriction on a resource in a defined environment, the resource comprising at least one of: an information technology (IT) account of a user, and an apparatus; continuously monitor a presence of a plurality of users in the defined environment; and manage the security restriction on the resource based on a detection of a pre-specified set of users from the plurality in the defined environment.

Another aspect of the present invention provides a computer-readable storage device storing computer instructions, which when executed, enables a computer system to manage security restrictions on a resource in a defined environment, the computer instructions comprising: maintaining a security restriction on a resource in a defined environment, the resource comprising at least one of: an information technology (IT) account of a user, and an apparatus; continuously monitoring a presence of a plurality of users in the defined environment; and managing the security restriction on the resource based on a detection of a pre-specified set of users from the plurality of users in the defined environment.

Figure 1:
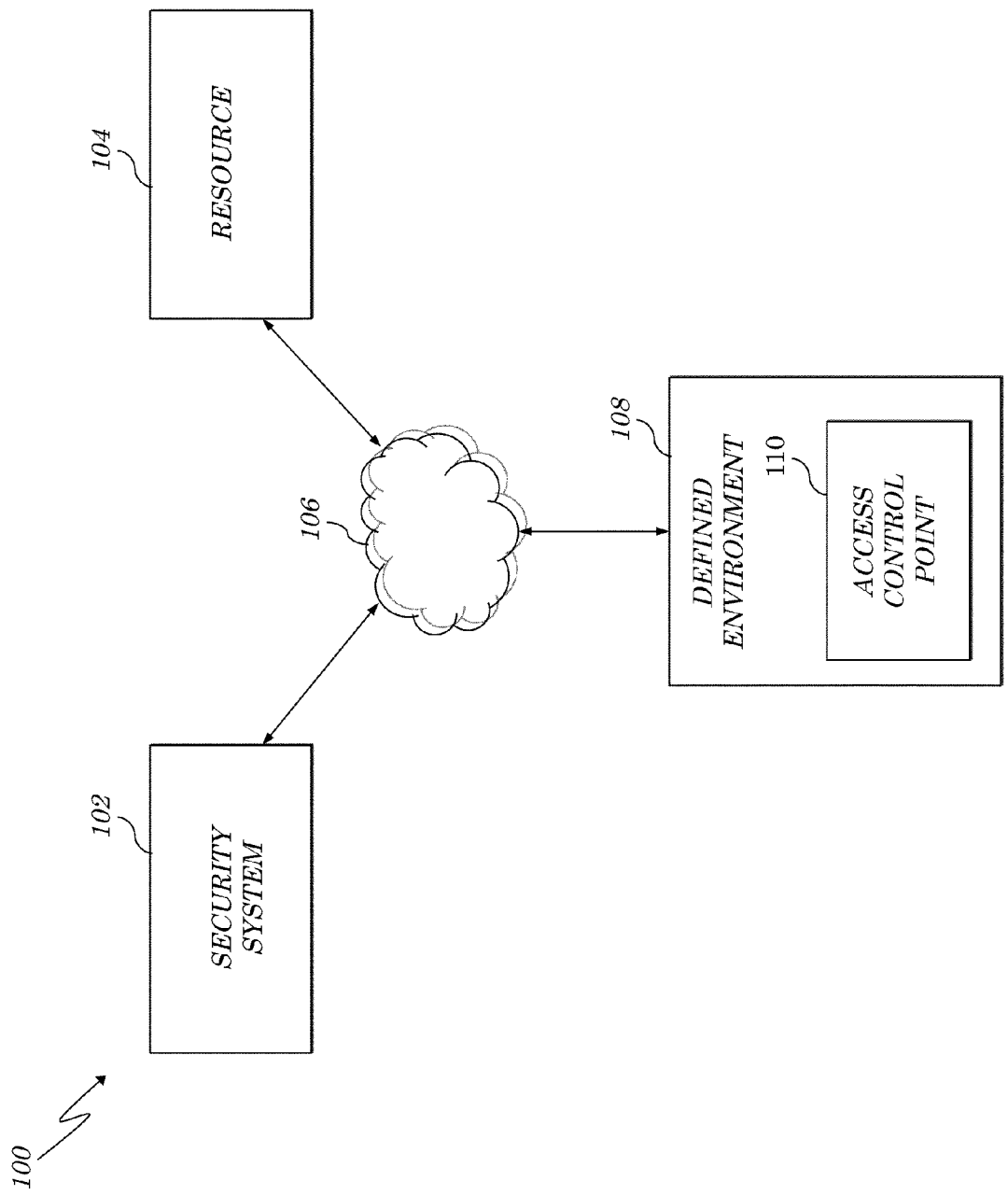
FIG. 1 shows a pictorial representation of a network in which aspects of the illustrative embodiments may be implemented.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Exemplary embodiments now will be described more fully herein with reference to the accompanying drawings, in which exemplary embodiments are shown. Embodiments of the invention manage security restrictions on a resource in a defined environment to provide authorization and access. Specifically, a security system maintains a security restriction on the resource (e.g., an information technology (IT) account of a user, or an apparatus) in a defined environment. The presence of a plurality of users is continuously monitored throughout the defined environment and, based on a detection of a pre-specified set of users from the plurality of users in the defined environment, the security restriction is managed (e.g., removed or maintained). In one embodiment, the system removes the security restriction from the resource to allow at least one of: access to the IT account of the user, and operation of the apparatus. The security restriction on the resource may then be reinstated in the case that the pre-specified set of users from the plurality of users is no longer present in the defined environment.

It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. The terminology used herein is for the purpose of describing particular embodiments only and is not intended to be limiting of this disclosure. For example, as used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," or similar language means that a particular feature, structure, or characteristic described in connection with the embodiment is included in at least one embodiment of the present invention. Thus, appearances of the phrases "in one embodiment," "in an embodiment," "in embodiments" and similar language throughout this specification may, but do not necessarily, all refer to the same embodiment.

With reference now to the figures, FIG. 1 depicts a system 100 that facilitates management of access to a resource or a set of resources. System 100 can include a security system 102 that can comprise one or more servers for managing access to information stored in one or more storage components (not shown) connected to a network 106. One or more computers can be employed to implement the functions of security system 102, for example. Security system 102 can receive access requests to a resource 104 (e.g., a user IT account) associated with one or more users and/or one or more authentication devices (e.g. a badge, RFID, bar code, etc.). Security system 102 can also receive information from a defined environment 108 (e.g., a facility, a building or room within the facility, a geographically bounded area, a company, an IT system, etc.) and access points 110 within defined environment 108 (e.g., security stations, monitored areas, secured doors, etc., as can be observed by readers, keypads, sensors, and the like). As will be further described herein, security system 102 maintains resource 104 in a secured state (i.e., restricted, disabled, in-active, locked-down, etc.) until one or more conditions is met. However, it'll be appreciated that an alterative embodiments, security system may maintain resource 104 in a non-secured state, which is then switched to a secured state when one or more conditions is met.

System 100 contains network 106, which is the medium used to provide communications links between each component. Network 106 may include connections, such as wire, wireless communication links, fiber optic cables, etc. System 100 also may be implemented as a number of different types of networks, such as, for example, an intranet, a local area network (LAN), or a wide area network (WAN). It will be appreciated that FIG. 1 is intended as an example, and not as an architectural limitation for different embodiments.

Figure 2:
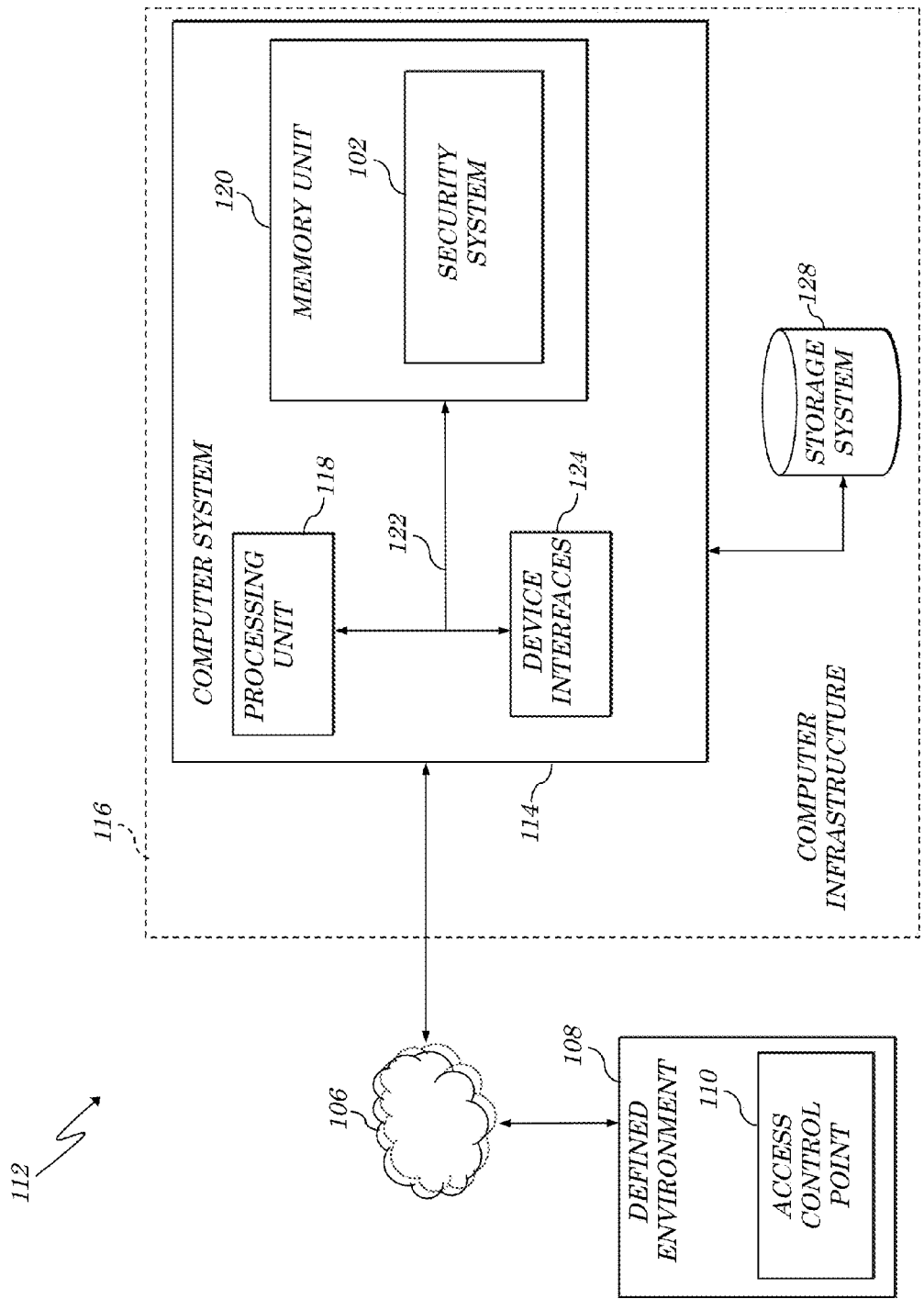
FIG. 2 shows a schematic of an exemplary computing environment according to illustrative embodiments.

Referring now to FIG. 2, a computerized implementation 112 of exemplary embodiments will be described in greater detail. As depicted, implementation 112 includes computer system 114 deployed within a computer infrastructure 116. This is intended to demonstrate, among other things, that embodiments can be implemented within network environment 106 (e.g., the Internet, a wide area network (WAN), a local area network (LAN), a virtual private network (VPN), a cloud computing environment, etc.), or on a stand-alone computer system. Still yet, computer infrastructure 116 is intended to demonstrate that some or all of the components of implementation 112 could be deployed, managed, serviced, etc., by a service provider who offers to implement, deploy, and/or perform the functions of the present invention for others.

Computer system 114 is intended to represent any type of computer system that may be implemented in deploying/realizing the teachings recited herein. In this particular example, computer system 114 represents an illustrative system for providing enhanced security. It should be understood that any other computers implemented under various embodiments may have different components/software, but will perform similar functions. As shown, computer system 114 includes a processing unit 118 capable of operating with security system 102 stored in a memory unit 120 to manage security restrictions on a resource in a defined environment, as will be described in further detail below. Also shown is a bus 122, and device interfaces 124.

Processing unit 118 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 118 receives user credential information from access point 110 of defined environment 108 and communicates it to security system 102. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 118 executes computer program code, such as program code for operating security system 102, which is stored in memory unit 120 and/or storage system 128. While executing computer program code, processing unit 118 can read and/or write data to/from memory unit 120 and storage system 128. Storage system 128 can include VCRs, DVRs, RAID arrays, USB hard drives, optical disk recorders, flash storage devices, and/or any other data processing and storage elements for storing and/or processing data. Although not shown, computer system 114 could also include I/O interfaces that communicate with one or more hardware components of computer infrastructure 116 that enable a user to interact with computer system 114 (e.g., a keyboard, a display, camera, etc.).

Figure 3:
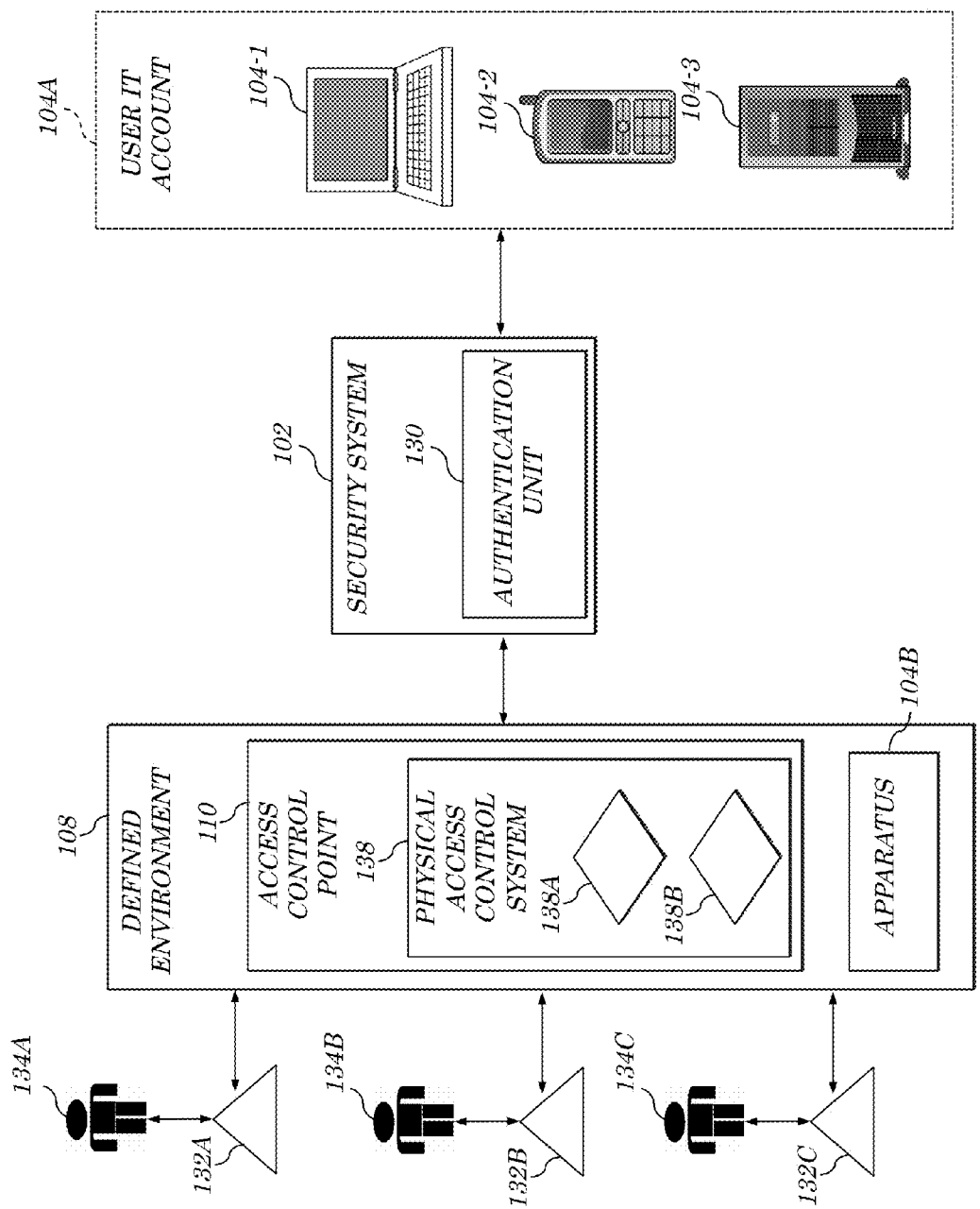
FIG. 3 shows an architecture in which management of security restrictions on a resource in a defined environment is implemented according illustrative embodiments.

Referring now to FIG. 3, the structure and operation of security system 102, resources 104A-B, and access control point 110 of defined environment 108 according to exemplary embodiments will be described in greater detail. As illustrated, security system 102 initially maintains a security restriction on resource 104A (e.g., user IT account) and/or resource 104B (e.g., an apparatus/device/system within a facility) until one or more conditions is met, e.g., the detection of a pre-specified set of users present within defined environment 108. In various embodiments, the pre-specified set of users may include a specific combination of users, or a maximum/minimum quantity of users. Based on the detection, the security restriction is managed (e.g., removed or maintained).

In one non-limiting embodiment, the presence of each of a plurality of users 134A-C is detected through the use of user credentials at access control point 110. To accomplish this, security system 102 comprises an authentication unit 130 configured to receive user credentials 132A-C from plurality of users 134A-C at access control point 110 of a secured area (i.e., defined environment 108 or an area within defined environment 108), and verify user credentials 132A-C to enable and authorize access to user IT account 104A associated with first user 134A, or to apparatus 104B. In one embodiment, authentication unit 130 can reference table(s) and/or list(s) that can include information associated with IT network access, such as network access credential information, network access policies, and information associated with physical access, such as physical access credential information and physical access policies of access control point 110 for user 134. Authentication unit 130 validates a first request by user 134A to enable access to resource 104 concurrent with physical access at access control point 110, as well as a subsequent request from user 134A to re-authenticate, which returns user IT account 104 to a secured state in an exemplary embodiment. Security system 102 and authentication unit 130 can facilitate enforcement of resource access policies as it pertains to each respective user 134A-C.

Security system 102 communicates with a physical access control system 136 of access control point 110 to provide physical access credential information associated with respective users and the physical access policy associated with the access control point 110 of defined environment 108. Physical access control system 136 can include one or more servers (not shown) that can manage user credentials, physical access policy, and physical access operation. Physical access control system 136 can provide security system 102 with updates or revisions to physical access credentials and the physical access policy, as physical access control system 136 can facilitate managing user physical access credentials, including new and expired physical access credentials. Physical access control system 136 also can manage and facilitate enrollment of new physical authentication devices, such as badges and key cards, which may be part of physical access control system 136.

In exemplary embodiments, physical access control system 136 includes one or more access readers 138A and 138B, which may comprise, for example, card readers, biometric readers, keypads, electromechanical locks, physical location/ motion sensors, etc. Access readers 138A and 138B may comprise card or badge readers that can scan cards or badges, whereby such cards or badges include user credentials 132, and such credentials can be analyzed by authentication unit 130 and compared to credential information on file to determine whether a particular user can be granted access at defined environment 108, or a particular area therein. Biometric readers can scan and analyze physical attributes of users 134A-C, such as fingerprint, retina, facial features, and information associated with one or more of these physical attributes can be utilized to determine whether users 134A-C can be granted physical access to defined environment 108, or some area therein. Keypads can be utilized to require users 134A-C to enter an appropriate password before access can be granted at access control point 110.

Physical access control system 136 makes access decisions responsive to data from access readers 138A and 138B for controlling, e.g., locking mechanisms to doors accessing areas of defined environment 108. In one embodiment, access readers 138A and 138B may be positioned on both sides of a locked door for controlling ingress/egress. Physical control system 136 can be network-capable to communicate information via a frame/packet network, and/or communication of information with authentication unit 130 of security system 102 and/or between access readers 138A and 138B.

During operation, security system 102 continuously monitors the presence of each user. Therefore, when each of users 134A-C attempts to gain access to defined environment 108 via access control point 110, security system 102 receives the respective user credentials from the authentication device. Authentication unit 130 references resource access information associated with each user, including information regarding resource access credentials, IT access event information (e.g., log in events, resources accessed, etc.), and/or network access policies. Further, authentication unit 130 receives location-based access information associated with the user from physical access control system 136. Such physical log-in location information can include information provided by location sensors, for example, and/or physical access information, such as physical access credentials, physical access policies, and/or physical access event information. If authentication 130 verifies user credentials 132A-132C of first, second, and third users 134A-134C, respectively, it is concluded that each user 134A-C is properly present within defined environment 108.

In one embodiment, the presence of first user 134A along with second user 134B, who may be a supervisor overseeing first user 134A, enables the security restriction (e.g., IT user account 104 is locked unless both users 134A and 134B are present) to be removed. Once user IT account 104 is enabled, the identity of user 134A is verified (e.g., via a username/ password log-in at a user terminal) to provide access to user IT account 104, which may operate on any number or combination of multiple disparate systems, e.g., computer 104-1, mobile device 104-2, and server 104-3). User 134A may then operate normally, with access to user IT account 104 as determined by security system 102.

Security system 102 is further configured to reinstate the security restriction on resource 104A in the case that the pre-specified set of users from plurality of users 134A-C in defined environment 108 changes. For example, in the event that user 134A and/or user 134B again passes through access control point 110, e.g., at the end of the work day or for lunch, user credentials 132A-B are received at physical control system 136 and sent to security system 102 to disable access to user IT account 104. Security system 102 receives a second instance of user credentials 132A-B for users 134A and/or 134B, respectively, from an authentication device operating with physical control system 136 of defined environment 108. After receiving the second instance of user credentials 132, the security restriction that IT user account 104 be locked unless users 134A and 134B are both present is reinstated, and user IT account 104 is returned to a more secured state where it is maintained until user credentials 132A and 132B are verified at physical control system 136 to enable access to user IT account 104. In one embodiment, an alert may be generated to indicate that the pre-specified set of users (e.g., users 134A-B) from plurality of users 134A-C is no longer present.

In alternative embodiments, access to resources 104A-B can be further managed upon the occurrence of the pre-specified set of users present within defined environment 108, as demonstrated in the following non-limiting security restriction use cases.

1. Too many: a security restriction is reinstated when a maximum number of users in the defined environment has been reached (e.g., indicating the presence of a fire hazard)
2. Too few: a security restriction is reinstated when a minimum number of users in the defined environment has not been reached (e.g., a particular task or process requires a pre-defined number of users to be performed adequately and/or safely).
3. Group: all users of a group must be on premises to enable each member of the group's accounts. For example, an assembly line might be deemed hazardous to operate without all roles being present.
4. User exclusion: if first and second users 134A-B are in the same room, the server is locked down. Otherwise it is accessible.
5. Group exclusion: prevents resource access when any member of one group is on premises with any member of another group. For example, this would demonstrate that two research groups that typically reside apart can never commingle secured information.
6. Group suspend: prevents a group of users from resource access until some condition is met or cleared. For example, access for a group could be suspended during a fire alarm or an assembly line malfunction.
7. Apparatus suspend: the security restriction requires that a particular device, system, apparatus, etc. be disabled if two many users are present within the defined environment. If that number is reached, the security requirement is valid, an alert is generated, and the operation and/or access to the apparatus is discontinued.
8. Mutually exclusive: only allows one account of a group of accounts to have access at any given time. For example, this ensures an IT task can't conflict with someone of the same role.
9. Scheduled: only allows resource access during schedules times. For example, this prevents resource access off of a user's shift.
9 Locality: prevents resource access for any combination of users when specific badge accessed rooms or buildings are entered. For example, a researcher may need his/her corporate access disabled when they use a local account in a laboratory.

For a given operating system (OS), the following are non-limiting commands to enable and disable access to resource 104 of user 134.
Windows®:
Net user UserID/active:no
Net user UserID/active:yes
Linux®:
passwd-I UserID where L stands for Lock
passwd-u UserID where U stands for Unlock
Unix® (AIX):
chuser account_locked=true UserID
chuser account_locked=true UserID Security system 102 may invoke these commands directly or access the corresponding OS APIs. This leaves the security settings intact but makes them unusable by disabling the User Logon, which would be required to put the security settings into effect. For an OS without this capability, user IDs could be provisioned or deprovisioned by executing a script that creates and removes UserID and their associated security settings on the fly. The same logic exists on on-boarding and off-boarding of user access to technology assets (HW, SW and Services) when an employee is hired or terminated. (Windows® is a registered trademark of Microsoft Corporation. Linux® is a registered trademark of Linus Torvalds. Unix® is a registered trademark of The Open Group).

In other embodiments, users 134A-C may be provided with remote access to security system 102. To enable remote access, an IT help desk, IT security administrator, automated system etc., receives user credentials and validates the identity of users 134A-C to grant access to user IT account 104A. Alternatively, users 134A-C may schedule and pre-authorize future remote access to user IT account 104A while presently logged in. In an automated approach, security system 102 and authentication unit 130 are configured to receive user credentials 132 from user 134A located remote to defined environment 108 for access to user IT account 104A according to a set of predefined conditions. For example, access may be granted for a specific time frame, or until user 134A logs off from his/her account or a specific application. Authentication unit 130 can reference IT access information associated with users 134A and 134B, including information regarding IT access credentials, IT access event information (e.g., log in events, resources accessed, etc.), and/or network access policies. Once user 134A has access to user IT account 104A, user 134A may operate normally, with access to user IT account 104 according to the set of predefined conditions. Access to user IT account 104A continues until one of the predefined conditions is met, e.g., time out, log-out, etc., whereby user IT account 104 is locked-down (i.e., returned to a more secured state that may not be accessed by user 134). IT system remains in a secured state until user credentials 132A and 132B are again verified to enable access to user IT account 104A.

It can be appreciated that the approaches disclosed herein can be used within a computer system to manage security restrictions on a resource in a defined environment. In this case, security system 102 can be provided, and one or more systems for performing the processes described in the invention can be obtained and deployed to computer infrastructure 116. To this extent, the deployment can comprise one or more of (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 114 may be described in the general context of computer-executable instructions, such as program modules, being executed by a computer. Generally, program modules include routines, programs, people, components, logic, data structures, and so on, which perform particular tasks or implement particular abstract data types. Exemplary computer system 114 may be practiced in distributed computing environments where tasks are performed by remote processing devices that are linked through a communications network. In a distributed computing environment, program modules may be located in both local and remote computer storage media including memory storage devices.

Figure 4:
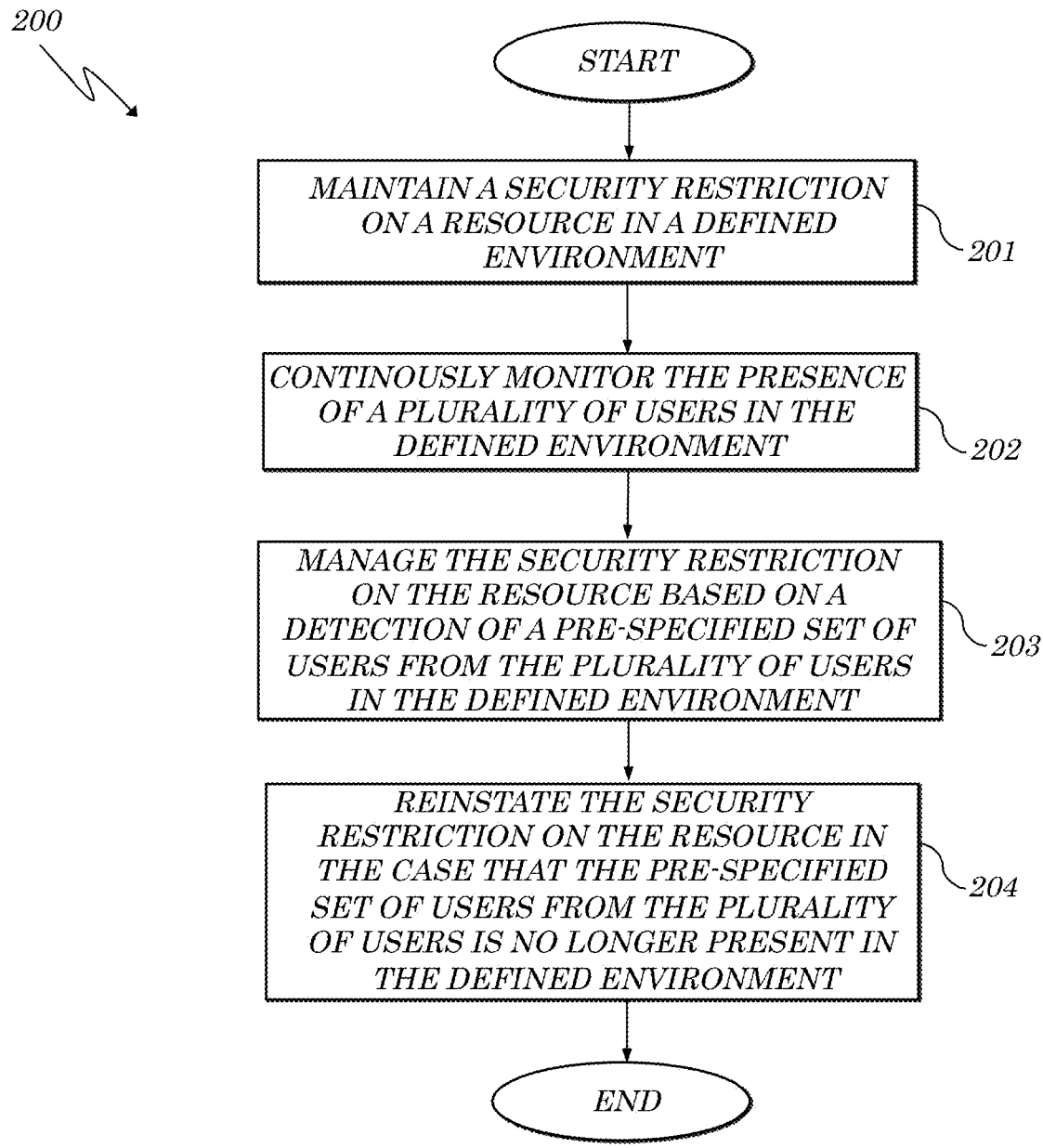
FIG. 4 shows a process flow for managing security restrictions on a resource in a defined environment according to illustrative embodiments.

As depicted in FIG. 4, computer system 114 (FIG. 2) carries out the methodologies disclosed herein. Shown is a method 200 for integrated physical access control and IT security. At 201, a security restriction is maintained on a resource in a defined environment, the resource comprising at least one of: an IT account of a user, and an apparatus. At 202, the presence of a plurality of users in the defined environment is continuously monitored. At 203, the security restriction on the resource is managed based on a detection of a pre-specified set of users from the plurality of users in the defined environment. At 204, the security restriction on the resource, if previously modified, can be reinstated in the case that the pre-specified set of users from the plurality of users is no longer present in the defined environment.

The flowchart of FIG. 4 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, as will be described herein, systems/units may also be implemented as a combination of software and one or more hardware devices. For instance, a Security system 102 and authentication unit 130 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

For example, an implementation of exemplary computer system 114 (FIG. 2) may be stored on or transmitted across some form of computer-readable storage medium. Computer-readable storage medium can be media that can be accessed by a computer. "Computer-readable storage medium" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. "Communication medium" typically embodies computer readable instructions, data structures, and program modules. Communication media also includes any information delivery media.

It is apparent that there has been provided an approach for managing security restrictions on a resource in a defined environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for managing security restrictions on a resource in a defined environment, the method comprising the computer-implemented steps of:
   maintaining a security restriction on a resource in a defined environment, the resource comprising at least one of: an information technology (IT) account of a user, and an apparatus;
   continuously monitoring a presence of a plurality of users in the defined environment;
   managing the security restriction on the resource based on a detection of a pre-specified set of users from the plurality of users in the defined environment, the managing the security restriction comprising removing the security restriction on the resource to allow at least one of: access to the IT account of the user, and operation of the apparatus; and
   reinstating the security restriction on the resource in the case that the pre-specified set of users from the plurality of users is no longer present in the defined environment, wherein the security restriction is reinstated when either of: a maximum number of users in the defined environment is attained, and a minimum number of users in the defined environment is not attained.

2. The method according to claim 1, the monitoring the presence of the plurality of users comprising receiving user credentials from each of the plurality of users.

3. The method according to claim 2, wherein the user credentials from each of the plurality of users is received via an authentication device at an access control system of an access control point.

4. The method according to claim 1, further comprising generating an alert to indicate that the pre-specified set of users from the plurality of users is no longer present in the defined environment.

5. A system for managing security restrictions on a resource in a defined environment, the system comprising:
   a memory medium comprising instructions;
   a bus coupled to the memory medium; and
   a processor coupled to a security system via the bus that when executing the instructions causes the system to:
   maintain a security restriction on a resource in a defined environment, the resource comprising at least one of: an information technology (IT) account of a user, and an apparatus;
   continuously monitor a presence of a plurality of users in the defined environment;
   manage the security restriction on the resource based on a detection of a pre-specified set of users from the plurality of users in the defined environment, the managing the security restriction comprising removing the security restriction on the resource to allow at least one of: access to the IT account of the user, and operation of the apparatus; and
   reinstate the security restriction on the resource in the case that the pre-specified set of users from the plurality of users is no longer present in the defined environment, wherein the security restriction is reinstated when either of: a maximum number of users in the defined environment is attained, and a minimum number of users in the defined environment is not attained.

6. The system according to claim 5, the instructions causing the system to monitor the presence of the plurality of users comprising instructions causing the system to receive user credentials from each of the plurality of users.

7. The system according to claim 6, wherein the user credentials from each of the plurality of users is received via an authentication device at an access control system of an access control point.

8. The system according to claim 5, further comprising instructions causing the system to generate an alert to indicate that the pre-specified set of users from the plurality of users is no longer present in the defined environment.

9. A computer-readable storage device storing computer instructions, which when executed, enables a computer system to manage security restrictions on a resource in a defined environment, the computer instructions comprising:
   maintaining a security restriction on a resource in a defined environment, the resource comprising at least one of: an information technology (IT) account of a user, and an apparatus;
   continuously monitoring a presence of a plurality of users in the defined environment;
   managing the security restriction on the resource based on a detection of a pre-specified set of users from the plurality of users in the defined environment, the managing the security restriction comprising removing the security restriction on the resource to allow at least one of: access to the IT account of the user, and operation of the apparatus; and
   reinstating the security restriction on the resource in the case that the pre-specified set of users from the plurality of users is no longer present in the defined environment, wherein the security restriction is reinstated in the case that either of: a maximum number of users in the defined environment is attained, and a minimum number of users in the defined environment is not attained.

10. The computer-readable storage device according to claim 9, the computer instructions causing the system to monitor the presence of the plurality of users comprising receiving user credentials from each of the plurality of users.

11. The computer-readable storage device according to claim 10, wherein the user credentials from each of the plurality of users is received via an authentication device at an access control system of an access control point.

12. The computer-readable storage device according to claim 9, further comprising computer instructions causing the system to generate an alert to indicate that the pre-specified set of users from the plurality of users is no longer present in the defined environment.

\* \* \* \* \*